United States Patent
Benthien et al.

(10) Patent No.: US 10,458,463 B2
(45) Date of Patent: Oct. 29, 2019

(54) ROTARY JOINT, FRAMEWORK CONSTRUCTION KIT AND METHOD FOR MANUFACTURING A ROTARY JOINT

(71) Applicant: AIRBUS OPERATIONS GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 584 days.

(21) Appl. No.: 15/164,486

(22) Filed: May 25, 2016

(65) Prior Publication Data
US 2016/0348711 A1  Dec. 1, 2016

(30) Foreign Application Priority Data

May 26, 2015 (EP) ..................................... 15169224

(51) Int. Cl.
*E04B 1/19* (2006.01)
*F16C 11/06* (2006.01)
(Continued)

(52) U.S. Cl.
CPC .......... *F16C 11/0695* (2013.01); *F16B 7/185* (2013.01); *F16C 11/0604* (2013.01);
(Continued)

(58) Field of Classification Search
CPC .... E04B 1/1903; E04B 1/1906; E04B 1/1909; E04B 2001/1942; E04B 2001/1957;
(Continued)

(56) References Cited

U.S. PATENT DOCUMENTS 1,002,229 A * 9/1911 Curtis ....................... F22B 7/16
 403/77
1,072,315 A * 9/1913 Cox .......................... F22B 7/16
 403/77

(Continued)

FOREIGN PATENT DOCUMENTS

CA  2 237 020 A1  6/1997
CN  103147509 A  6/2013
(Continued)

OTHER PUBLICATIONS

"Additive Manufacturing." EOS: E-Manufacturing Solutions. Aug. 4, 2014, [online], [retrieved on Apr. 12, 2018] Retrieved from the Internet <URL: https://web.archive.org/web/20140408143224/http://www.eos.info/additive_manufacturing/for_technology_interested>.*

(Continued)

*Primary Examiner* — Josh Skroupa
(74) *Attorney, Agent, or Firm* — Jenkins, Wilson, Taylor & Hunt, P.A.

(57) ABSTRACT

A rotary joint includes a socket rod having a socket rod flange with an at least partly spheroid concave bearing surface at a first end, a housing nut encircling the socket rod and having a threaded wrenching head, and a ball rod having an at least partly spheroid convex bearing surface and threaded side walls around the bearing surface. The diameter of the threaded side walls of the ball rod corresponds to a diameter of the threaded wrenching head of the housing nut.

18 Claims, 6 Drawing Sheets

(51) Int. Cl.
*F16B 7/18* (2006.01)
*F16C 11/10* (2006.01)
*B64C 1/08* (2006.01)
*F16C 7/02* (2006.01)
*F16C 9/04* (2006.01)
*E04C 3/04* (2006.01)

(52) U.S. Cl.
CPC ...... *F16C 11/0623* (2013.01); *F16C 11/0661* (2013.01); *F16C 11/0685* (2013.01); *F16C 11/103* (2013.01); *E04B 2001/1942* (2013.01); *E04B 2001/1969* (2013.01); *E04C 2003/0495* (2013.01); *F16B 7/182* (2013.01); *F16C 7/02* (2013.01); *F16C 9/04* (2013.01); *F16C 2226/60* (2013.01); *F16C 2350/00* (2013.01)

(58) Field of Classification Search
CPC .. E04B 2001/1969; F16B 7/182; F16B 7/185; F16C 11/0661; F16C 11/0695; F16C 11/106; F16D 3/01; F16D 3/18; Y10T 403/32065; Y10T 403/32196; Y10T 403/32204; Y10T 403/32213; Y10T 403/32655; Y10T 403/32672; Y10T 403/32681; Y10T 403/32737; Y10T 403/341
USPC ..... 403/60, 76–78, 125, 127, 128, 135, 170; 464/102–105, 149
See application file for complete search history.

(56) References Cited

U.S. PATENT DOCUMENTS

| | | | | |
|---|---|---|---|---|
| 2,900,196 A | * | 8/1959 | Nienke | B60G 7/005 403/77 |
| 3,338,585 A | * | 8/1967 | Poorman | B23B 31/08 464/105 |
| 3,414,302 A | * | 12/1968 | Priest | F16C 11/0661 403/125 |
| 3,864,049 A | * | 2/1975 | Ono | E04B 1/1906 403/171 |
| 3,958,904 A | * | 5/1976 | Rusbach | F16C 11/106 403/90 |
| 4,037,884 A | | 7/1977 | Bachinger | |
| 4,161,088 A | | 7/1979 | Gugliotta et al. | |
| 4,273,461 A | * | 6/1981 | Kjellstrand | F16C 11/0661 403/125 |
| 4,511,276 A | * | 4/1985 | Doutt | F16C 11/0661 403/77 |
| 4,626,123 A | * | 12/1986 | Brown | E04B 1/1906 248/160 |
| 4,650,361 A | | 3/1987 | Seuster | |
| 4,796,389 A | * | 1/1989 | Bini | E04B 1/1906 52/2.26 |
| 5,088,852 A | * | 2/1992 | Davister | E04B 1/1906 403/143 |
| 5,101,607 A | | 4/1992 | Staeger | |
| 5,115,725 A | * | 5/1992 | Horiuchi | F02B 23/0672 403/125 |
| 5,413,031 A | * | 5/1995 | Kohlmeyer | B23Q 1/5462 403/122 |
| 5,711,709 A | | 1/1998 | McCoy | |
| 6,622,447 B1 | | 9/2003 | Kessler | |
| 8,033,920 B1 | | 10/2011 | Benson | |
| 8,246,266 B2 | | 8/2012 | Lang et al. | |
| 8,679,275 B2 | * | 3/2014 | Schalla | F16C 7/02 156/169 |
| 9,615,564 B2 | * | 4/2017 | Liney | A01K 97/10 |
| 9,797,124 B2 | | 10/2017 | Zhou et al. | |
| 10,378,198 B2 | | 8/2019 | Benthien et al. | |
| 2006/0175501 A1 | * | 8/2006 | Richter | F16C 11/0661 248/288.31 |
| 2015/0167288 A1 | | 6/2015 | Harkin | |
| 2017/0058959 A1 | | 3/2017 | Benthien | |
| 2017/0276184 A1 | | 9/2017 | Leiseder | |

FOREIGN PATENT DOCUMENTS

| | | | | |
|---|---|---|---|---|
| CN | 103643742 A | | 3/2014 | |
| DE | 24 51 658 A1 | | 5/1976 | |
| DE | 37 36 784 A1 | | 5/1989 | |
| DE | 38 00 547 A1 | | 7/1989 | |
| DE | 10 2004 038503 A1 | | 2/2006 | |
| EP | 0 147 669 A2 | | 7/1985 | |
| EP | 0 986 685 B1 | | 2/2004 | |
| EP | 1 358 392 B1 | | 2/2012 | |
| EP | 2 875 938 A1 | | 5/2015 | |
| EP | 3 098 463 B1 | | 3/2018 | |
| FR | 509657 A | * | 11/1920 | ............ F16C 11/106 |
| FR | 901 628 A | | 8/1945 | |
| FR | 1210093 A | * | 3/1960 | ......... F16C 11/0661 |
| GB | 1464777 A | * | 2/1977 | .......... E04B 1/1903 |
| GB | 2 077 347 A | | 12/1981 | |
| GB | 2 503 422 A | | 1/2014 | |
| WO | WO 03/054401 A1 | | 7/2003 | |
| WO | WO 2014/006422 A2 | | 1/2014 | |

OTHER PUBLICATIONS

Extended European Search Report for Application No. 15 16 9224 dated Nov. 13, 2015.
Chinese Office Action for Application No. 201610348268.3 dated Feb. 14, 2018.
Chinese Office Action for Application No. 201610348268.3 dated Sep. 11, 2018.
Notice of Allowance for U.S. Appl. No. 15/247,008 dated Apr. 10, 2019.
Extended European Search Report for Application No. 15 182 771.4 dated Feb. 15, 2016.
European Office Action for European Application 15 182 771.4 dated Mar. 28, 2018.
Restriction Requirement for U.S. Appl. No. 15/247,008 dated Sep. 18, 2018.
Non-Final Office Action for U.S. Appl. No. 15/247,008 dated Dec. 10, 2018.

* cited by examiner

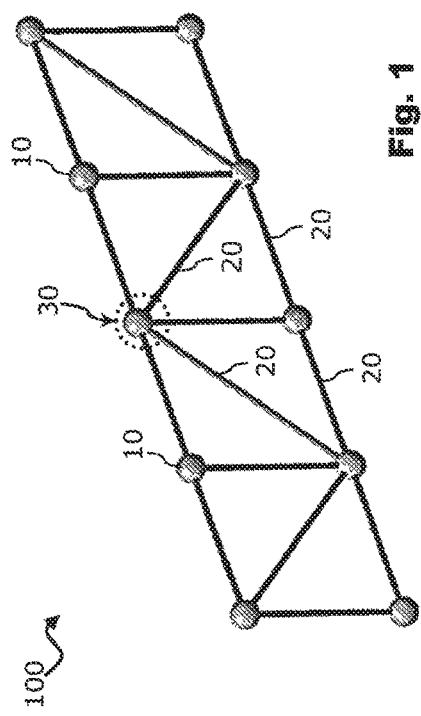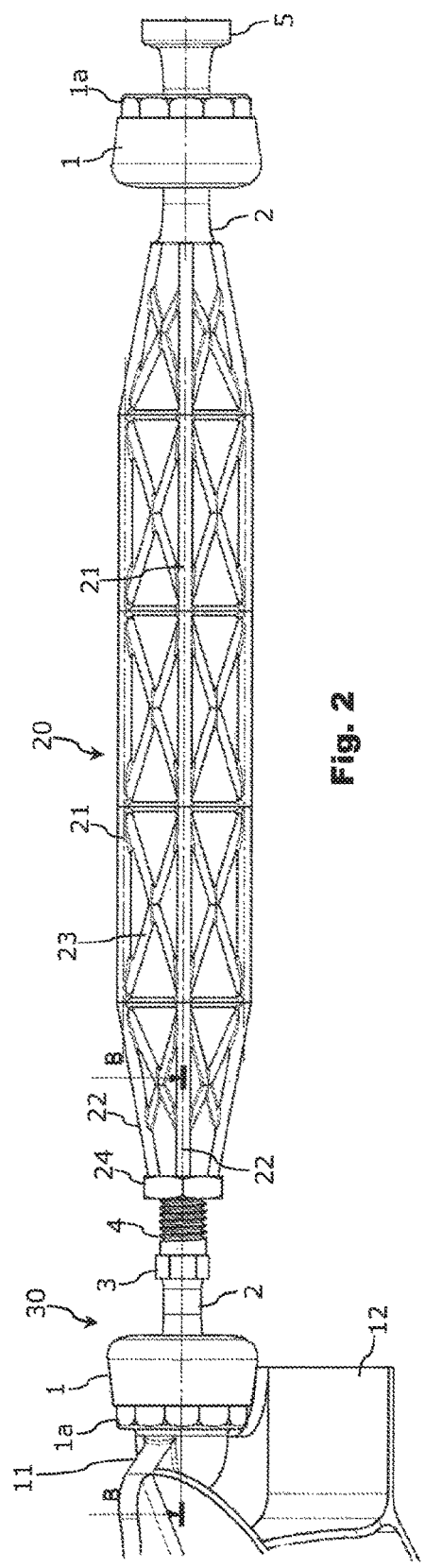

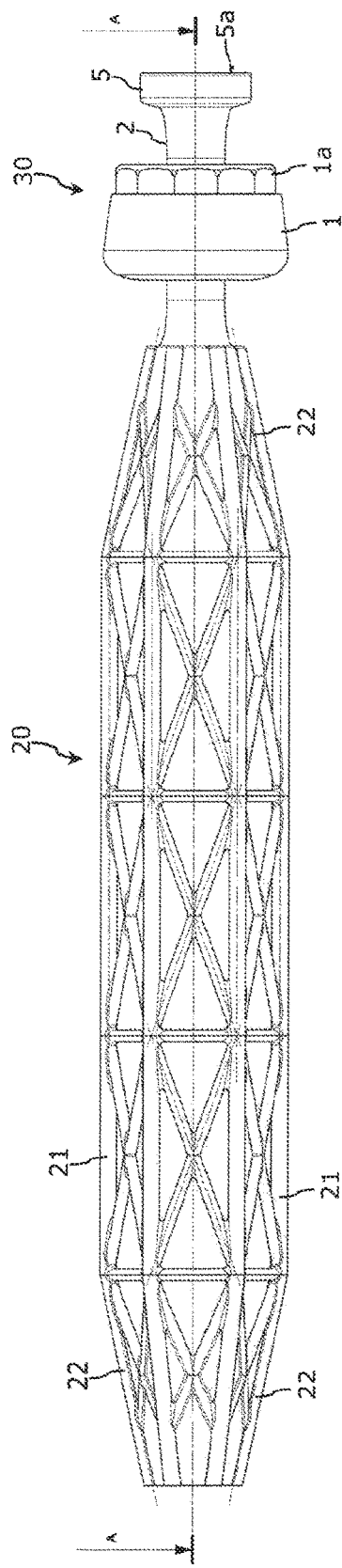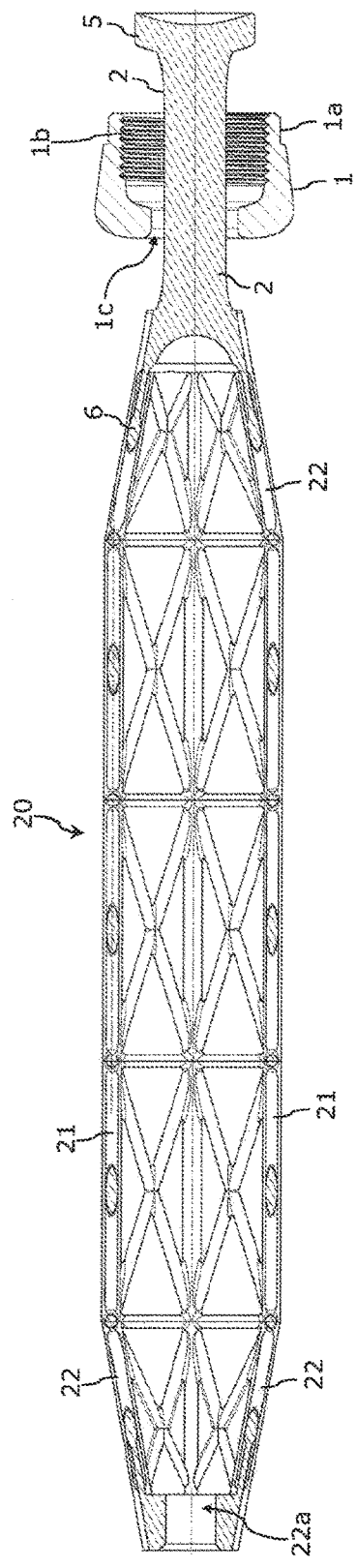

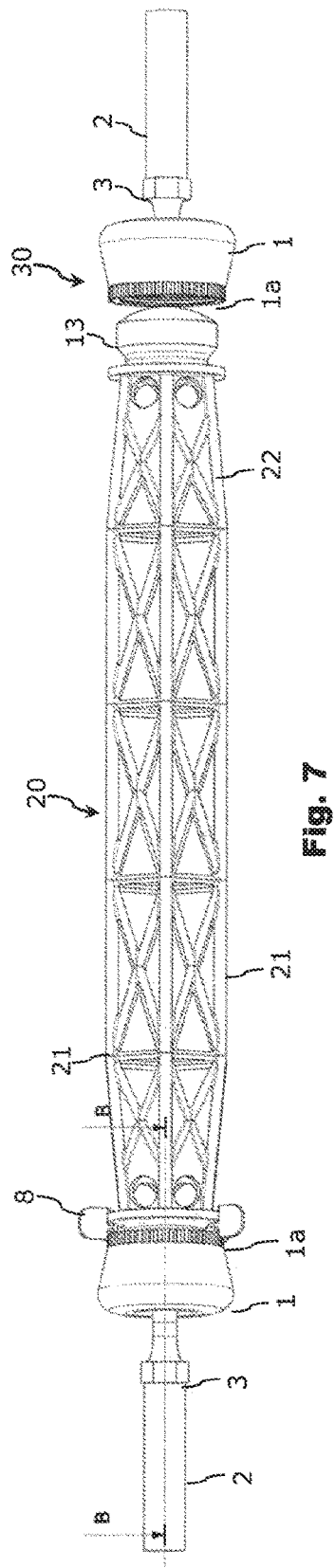
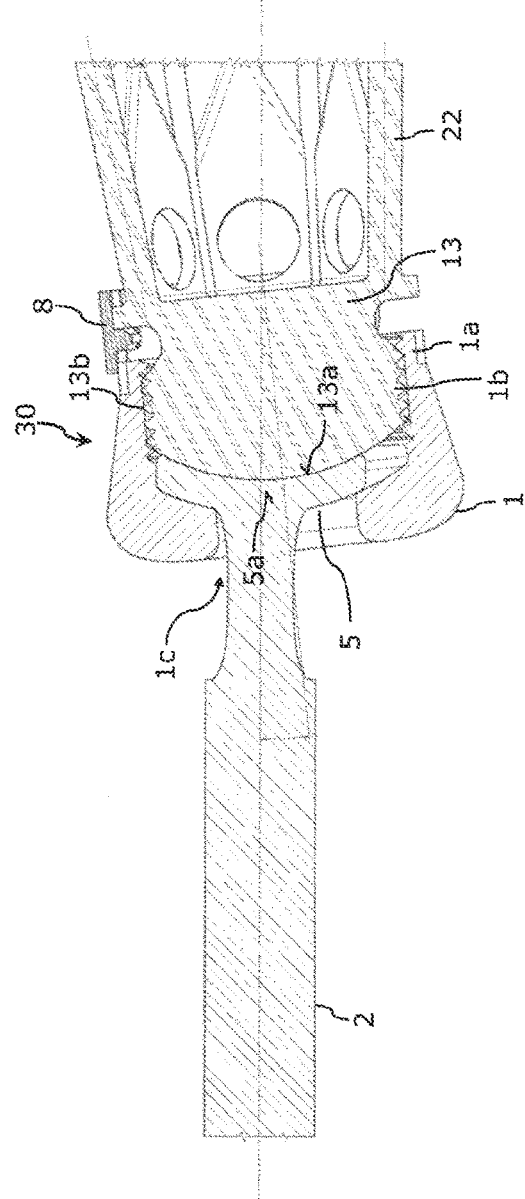
Fig. 7
Fig. 8

ROTARY JOINT, FRAMEWORK CONSTRUCTION KIT AND METHOD FOR MANUFACTURING A ROTARY JOINT

CROSS-REFERENCE TO RELATED APPLICATION

This application claims priority to EP 15 169224.1 filed May 26, 2015, the entire disclosure of which is incorporated by reference herein.

TECHNICAL FIELD

The present disclosure relates to rotary joints, a framework construction kit employing rotary joints and a method for manufacturing a rotary joint to be employed in frameworks.

BACKGROUND

Beams, joists and frames for construction work, for example in aeronautics, civil engineering or architecture, are designed to withstand bending forces acting perpendicular to the direction of extension of the respective beams. Conventional beams may be implemented as an integral part with flanges at the edges and a web spanning between the flanges. Alternatively, instead of a web, cutter milled struts may be implemented between parallel running longitudinal support bars, thus leading to decreased weight of the beam due to less material being used to form the beam. Such struts may be employed in three-dimensional truss structures, as for example disclosed in documents EP 0 986 685 B1 or EP 1 358 392 B1.

Local load introduction into such beams or frames may, however, lead to torsional moments that are introduced into the attachment joints of the struts with the longitudinal support bars. Such torsional moments may in turn lead to additional moments within the longitudinal support bars that will have to be compensated for by local strengthening means, thereby nullifying some or all of the weight advantages gained.

Document U.S. Pat. No. 6,622,447 B1 discloses a modular structural system for building models and structures, using a plurality of connector hub members with spherical symmetry, and a plurality of strut members with longitudinal symmetry, wherein the strut members are removably engageable with the connector hub members placing the strut members in corresponding radial and tangential positions relative to the connector hub members.

Document CA 2 237 020 A1 and DE 38 00 547 A1 each disclose a set of structural elements for producing supporting structures, using supporting bars and cylindrical connecting elements for insertion heads provided on the end sides of the supporting bars.

Document DE 37 36 784 A1 discloses a node-truss system with rod-shaped elements which are pivotally connected to node bodies. Document U.S. Pat. No. 4,161,088 A discloses a pipe-and-ball truss array in which the outer chord of the truss array comprises an outer hollow pipe element having a structural tee element extending radially outward from the outer surface thereof in a plane normal to the plane in which the deck surface is to be supported on the truss array and an inner rod running through the pipe along the longitudinal axis thereof. A hollow substantially ball-like member, such as a hollow spherical member, is provided which is common to a plurality of truss members which truss members are joined to the spherical member by bolting.

SUMMARY

One of the ideas of the disclosure herein is to provide solutions for constructing frameworks that compensate additional torsional moments coupled into the joints of the frameworks in an efficient and weight saving manner, and that allow for a quick installation with a minimum number of individual parts to be mounted and fixed.

A first aspect of the disclosure pertains to a rotary joint comprising a socket rod having a socket rod flange with an at least partly spheroid concave bearing surface at a first end, a housing nut encircling the socket rod and having a threaded wrenching head, and a ball rod having an at least partly spheroid convex bearing surface and threaded side walls around the bearing surface. The diameter of the threaded side walls of the ball rod corresponds to a diameter of the threaded wrenching head of the housing nut.

According to a second aspect of the disclosure, a framework construction kit comprises at least one rotary joint according to the first aspect of the disclosure, and at least one interconnection strut connected to a second end of the socket rod of the at least one rotary joint.

According to a third aspect of the disclosure, a framework comprises a plurality of rotary joints according to the first aspect of the disclosure, and a plurality of interconnection struts, each connected to the socket rods of the plurality of rotary joints.

According to a fourth aspect of the disclosure, a method for manufacturing a rotary joint comprises integrally forming a socket rod having a socket rod flange with an at least partly spheroid concave bearing surface at a first end together with a housing nut, the housing nut encircling the socket rod and having a threaded wrenching head, using a 3D printing or additive manufacturing, AM, technique, and forming a ball rod having an at least partly spheroid convex bearing surface and threaded side walls around the bearing surface using a 3D printing or additive manufacturing, AM, technique. The threaded wrenching head of the housing nut is then threadingly engaged with the threaded side walls of the ball rod, thereby housing the socket rod flange between the housing nut and the ball rod.

The idea on which the present disclosure is based is to improve the connection points of a framework made up of struts by employing rotary joints of a ball-and-socket type. The stationary connection part is formed by a single protruding ball rod that has an at least partly spheroid convex outer surface. The side walls of the ball rod around the convex outer surface are provided with a cylindrically threaded engagement surface for engagement with a housing nut. The movable connection part is formed by a socket rod that has an at least partly spheroid concave outer surface, the shape of the concave outer surface corresponding to the shape of the convex outer surface of the stationary connection part so that both connection parts may be brought in contact with each other and the touching convex and concave outer surface may move in a sliding manner with respect to each other, similar to a ball-and-socket connection.

In order to restrain the movable connection part to not detach from the convex outer surface of the stationary connection part a housing nut is slipped on the socket rod. The housing nut has an inner thread on its inner walls corresponding to the cylindrically threaded engagement surface of the stationary connection part. The movable connection part has a generally tapered shape, i.e. the end portion with the concave outer surface is flanged with respect to the extending rod portion. The opening of the housing nut has a diameter that is larger than the diameter of the extending rod portion, but smaller than the diameter of the flanged end portion. Therefore, when the housing nut is threadingly engaging the threaded engagement surface of the stationary connection part, the housing nut clamps the flanged end portion between the rim of the housing nut opening and the stationary connection part so that the movable connection part will be secured against detachment from the stationary connection part, i.e. a linear movement of the movable connection part in the direction of the extending rod portion away from the stationary connection part will be mechanically restrained.

Along the contacting surfaces of the stationary connection part ("ball" part) and the movable connection part ("socket" part) a swivelling motion of the socket rod with respect to the attached structure of the stationary connection part may be realized. A lateral moment on the strut coupled to the socket rod with respect to the contacting surfaces of the rotary joint will lead to a shifting movement of the socket rod along the outer surface of the stationary connection part. Thus, any bending moment acting perpendicular to the orientation of the strut/socket rod will vanish with respect to the rotary joint due to the compensating sliding movement of the movable connection part with respect to the stationary connection part. This means in turn that the rotary joint will be essentially free of any bending moments that would otherwise be brought into the rotary joints. The axes of struts coupled to such rotary joints will always be oriented towards the center of the rotary joint, thereby balancing out the rotary joint optimally under any loading situation on the struts.

Particularly advantageous may additionally be the reduction of costs, weight, lead time, part count and manufacturing complexity coming along with employing any kind of layer manufacturing technology when designing the components of the framework construction kit, specifically the rotary joints.

According to an embodiment of the rotary joint, the housing nut may have a nut hole on the opposite side of the threaded wrenching head, the diameter of the nut hole being larger than the diameter of the socket rod, but smaller than the diameter of the socket rod flange. This way, the socket rod flange is given enough leeway to swivel along the ball rod bearing surface, but is not able to detach from the ball rod perpendicular to its surface.

According to a further embodiment of the rotary joint, the curvature of the concave bearing surface of the socket rod flange may correspond to the curvature of the convex bearing surface of the ball rod. This enables the implementation of a smooth contact between the two movable parts, thereby reducing the inner friction within the joint.

According to a further embodiment of the rotary joint, the socket rod may comprise a threaded shank at a second end opposite to the first end. In one embodiment, the socket rod may additionally comprise a wrenching contour arranged on the circumference of the socket rod between the socket rod flange and the threaded shank. With the threaded shank, the socket rod may be connected to an interconnection strut and the length of the protruding part of the socket rod with respect to the interconnection strut may be continuously adjusted. This advantageously leads to greater flexibility in constructing frameworks using struts of standardized lengths.

According to a further embodiment of the rotary joint, the rotary joint may further comprise a sliding washer which is arranged between the socket rod flange and the inner walls of the threaded wrenching head. The sliding washer may have a diameter which is smaller than the diameter of the socket rod flange, thereby allowing for a greater maximum displacement angle between the socket rod and the ball rod.

According to an embodiment of the framework construction kit, the interconnection strut may comprises a trussed beam having a plurality of substantially longitudinally running chord members and a plurality of web members spanning between the chord members. Trussed beams, for example beams formed from an isometric framework of gridded framework members, are optimized for weight and load balancing, thereby being especially appealing to any aviation application.

If the socket rod of the rotary joint is formed with a threaded shank, the at least one interconnection strut may comprise in a further embodiment, at a first strut end portion, a female-threaded socket rod duct engaged with the threaded shank of the socket rod.

According to an embodiment of the framework construction kit, the at least one interconnection strut may comprise at a second strut end portion—additionally or alternatively to the female-threaded socket rod duct—a receptacle engaged in a snap-fit engagement with an end portion of the socket rod of the rotary joint. A snap-fit engaged socket rod allows for rapid construction and deconstruction of a framework with rotary joints.

According to an alternative embodiment of the framework construction kit, the at least one interconnection strut may be interlocked at a second strut end portion with the ball rod by an annular clamping bracket. The clamping bracket may be sleeved at least partly over the second strut end portion and the ball rod and hold them together in a clamping fashion.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

FIG. 1 schematically illustrates a framework assembly with rotary joints according to an embodiment of the disclosure herein.

FIG. 2 schematically illustrates a front view of a connection strut with rotary joints according to another embodiment of the disclosure herein.

FIG. 5 schematically illustrates a front view of a connection strut with a connection part of a rotary joint according to another embodiment of the disclosure herein.

FIG. 6 schematically illustrates a cross-sectional view along the line A-A of FIG. 5.

FIG. 7 schematically illustrates a front view of a connection strut with a connection part of a rotary joint according to yet another embodiment of the disclosure herein.

FIG. 8 schematically illustrates a cross-sectional view along the line B-B of FIG. 7.

DETAILED DESCRIPTION

Figure 3:
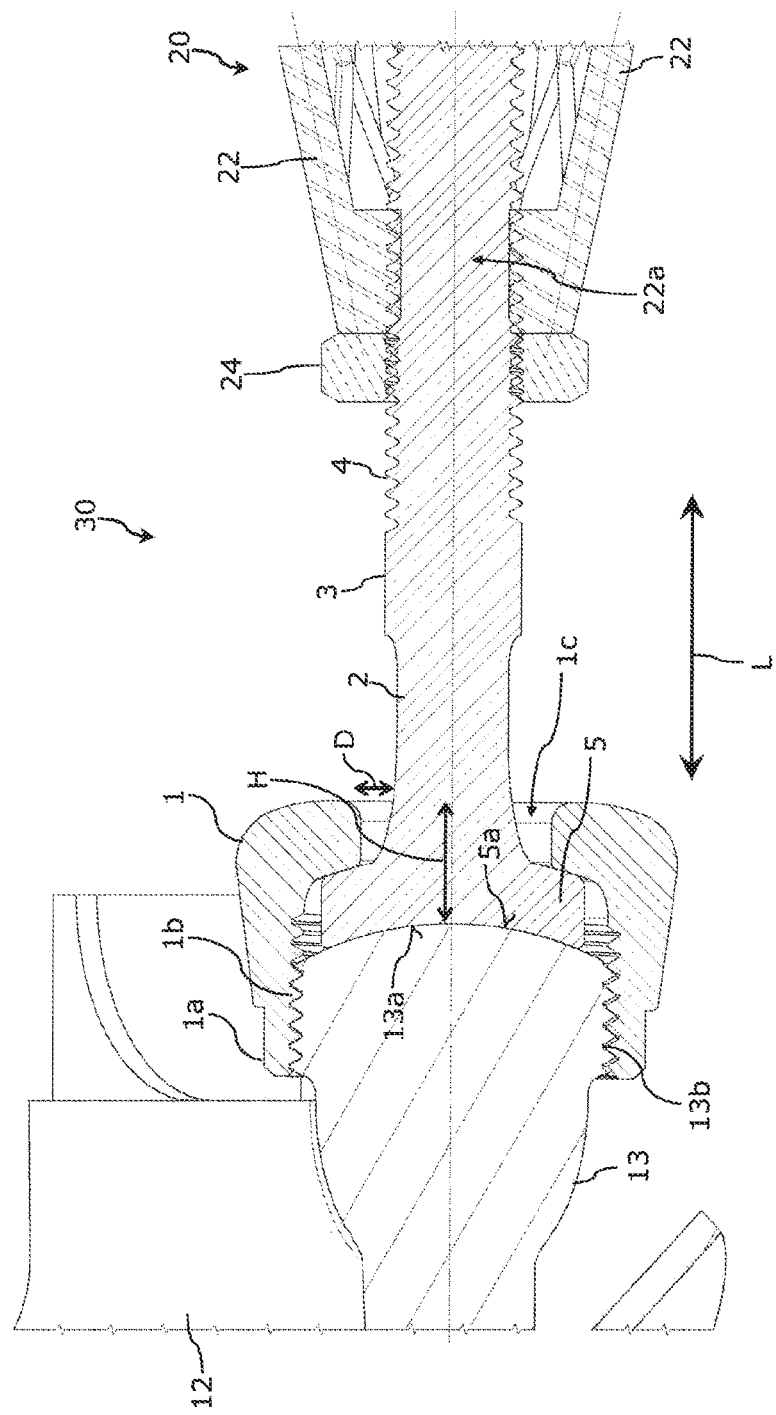
FIG. 3 schematically illustrates a cross-sectional view along the line B-B of FIG. 2 in a baseline position.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Some of the components, elements and assemblies as disclosed hereinforth may be fabricated using free form fabrication (FFF), direct manufacturing (DM), fused deposition modelling (FDM), powder bed printing (PBP), laminated object manufacturing (LOM), stereolithography (SL), selective laser sintering (SLS), selective laser melting (SLM), selective heat sintering (SHS), electron beam melting (EBM), direct ink writing (DIW), digital light processing (DLP) and/or additive layer manufacturing (AM). Those techniques belong to a general hierarchy of additive manufacturing (AM) methods. Often termed as 3D printing, those systems are used for generating three-dimensional objects by creating a cross-sectional pattern of the object to be formed and forming the three-dimensional solid object by sequentially building up layers of material. Any of such procedures will be referred to in the following description as AM or 3D printing without loss of generality. AM or 3D printing techniques usually include selectively depositing material layer by layer, selectively fusing or solidifying the material and removing excess material, if needed.

3D or AM techniques may be used in procedures for building up three-dimensional solid objects based on digital model data. 3D/AM employs an additive process where layers of material are sequentially built up in different shapes. 3D/AM is currently used for prototyping and distributed manufacturing with multiple applications in engineering, construction, industrial design, automotive industries and aerospace industries.

FIG. 1 shows a schematic illustration of a framework 100. The framework 100 comprises a multitude of laterally and diagonally running struts 20 which may be interconnected among each other at joint regions 30. Each of the joint regions 30 may have a rotary joint 10 that is connected to each of the end portions of the struts 20 reaching into the particular joint region 30. The framework 20 may have a generally two-dimensional layout, i.e. the struts 20 and joints 10 are substantially lying in one plane of extension which may be flat or arcuate. In the exemplary case of FIG. 1 the framework 100 takes on the shape of a frame having two substantially parallel beams (running from bottom left to top right in the drawing) formed by a first subset of the interconnection struts 20 and diagonally staggered crossbeams between the two substantially parallel beams formed by a second subset of the interconnection struts 20.

The framework 20 may also have a generally three-dimensional layout, i.e. for each first plane of extension defined by a subset of struts 20, another subset of struts 20 is connected to rotary joints 10 in a manner that defines at least one further second plane of extension being arranged under a non-zero angle with respect to the first plane of extension. Rotary joints as disclosed hereinforth generally denote spheroid joints or socket type joints where a stationary part having a generally spheroid or at least partly spheroid convex outer bearing surface is in sliding contact with a generally spheroid least partly spheroid concave counter-bearing surface of a hinged part. The stationary part may be a joint member, such as a bracket, fixture or holder, while the hinged and movable part may be a strut, rod or other truss element, such as a strut 20 as shown in FIG. 1.

The number of struts 20 being interconnected in each joint region 30 may vary and may in particular be not limited to the explicit number of two, three or five as exemplarily shown in FIG. 1. Specifically, the number of interconnecting struts 20 at each joint region 30 may take on any number greater than one. To that end, the rotary joints 10 employed at each joint region 30 may have a number of interconnection assemblies that is at least equal or greater than the number of interconnecting struts 20. Moreover, the kind, type and specific design of the rotary joints 10 may vary depending on the particular joint region 30 they are employed at.

Generally, a set of rotary joints 10 and a set of interconnecting struts 20 may form a framework construction kit which may be used to construct different frameworks of varying extension, size, shape and complexity. Thus, while it may be favorable to use as few different types of rotary joints 10 and as few different types of interconnecting struts 20 as possible to guarantee high flexibility in framework design and low implementation effort, it may as well be possible to use more different types of rotary joints 10 and/or interconnecting struts 20 in order to specifically be able to tailor the framework construction kit to the particular needs and constraints of the framework and its intended field of application.

The framework construction kits as disclosed hereinforth may be used in a lot of applications, including—but not limited to—constructions of frames, stringers and crossbeams in aircraft, interior design, bridge building, vehicle carriages, civil engineering, applications for children's toys and similar. A particular application pertains to the construction of frameworks in aircraft. Such frameworks include connection rods for bracing a fuselage structure of an aircraft, structurally reinforcing a fuselage structure and/or for fastening a component on the fuselage structure. Those connection rods are often referred to as "Samer rods" or "Samer-type rods" and generally have a central strut portion between two end portions used to interconnect the connection rod between two joints or brackets.

Conventional Samer rods generally have a hollow-cylindrical central portion that may taper towards the end regions. The end regions may have a shank and eyes arranged at shank ends on both sides for connecting the Samer rod to the fuselage structure. In order to link the Samer rod to the structure of the aircraft, a clamp or a forked bracket attached to the structure. The clamp (or bracket) has a bore which may align with the eye of a shank end so that a bolt introduced through the bore and the eye pivotably couples the Samer rod to the clamp (or bracket).

In contrast to such conventional Samer rods the linking mechanism of struts 20 as illustrated herein, the number of individual parts used for mechanically linking the struts 20 to a structure or framework, such as the framework 100, by way of rotary joints 10 is greatly reduced. Additionally, the usage of less individual parts for the struts 20 and the rotary joints 10 requires less effort in positioning the struts with respect to the brackets or clamps to which are to be fastened. This, in turn, leads to lower manufacturing costs and higher throughput in constructing frameworks.

Figure 9:
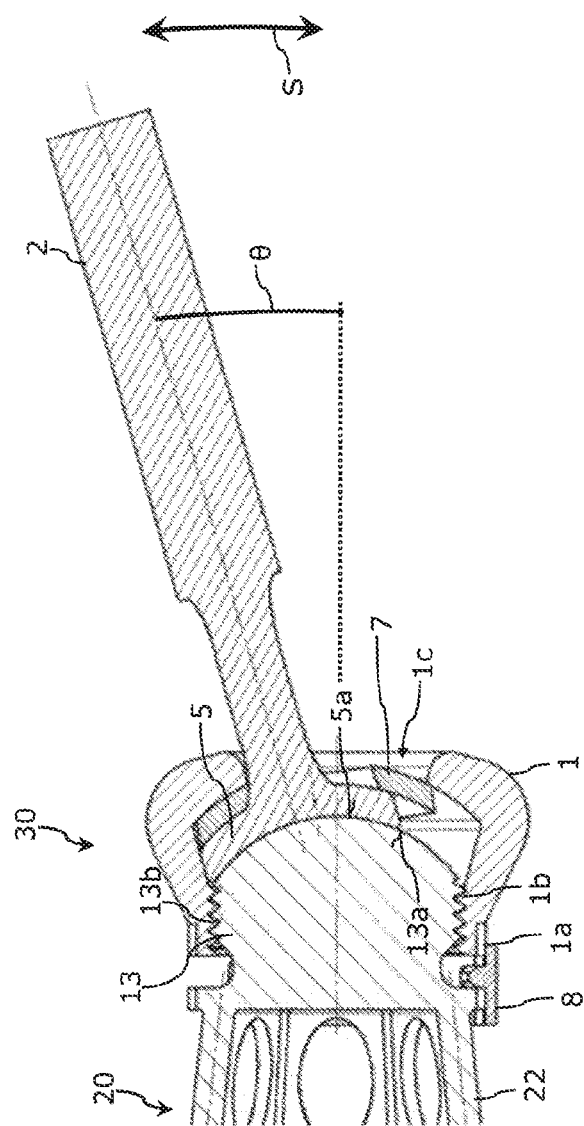
FIG. 9 schematically illustrates a cross-sectional view of a rotary joint with the strut swivelled out of its baseline position according to yet another embodiment of the disclosure herein.

The following FIGS. 2 to 6 exemplarily show schematic illustrations of a single strut 20 or connection rod as it may be used in a framework 100 of FIG. 1. The struts 20 exemplarily shown in FIGS. 2 to 6 may have different end portions, depending on the type of rotary joint 10 used and depending on whether two or more struts 20 are to be interconnected or a single strut is to be fastened to a clamp or bracket. In the FIGS. 7, 8 and 9, further illustrations of a single strut 20 or connection rod as it may be used in a framework 100 of FIG. 1 are shown. In contrast to the struts of FIGS. 2 to 6, the struts 20 of the FIGS. 7, 8 and 9 are connected to the ball rod 13 of the rotary joint 10 instead of the socket rod 2.

Figure 4:
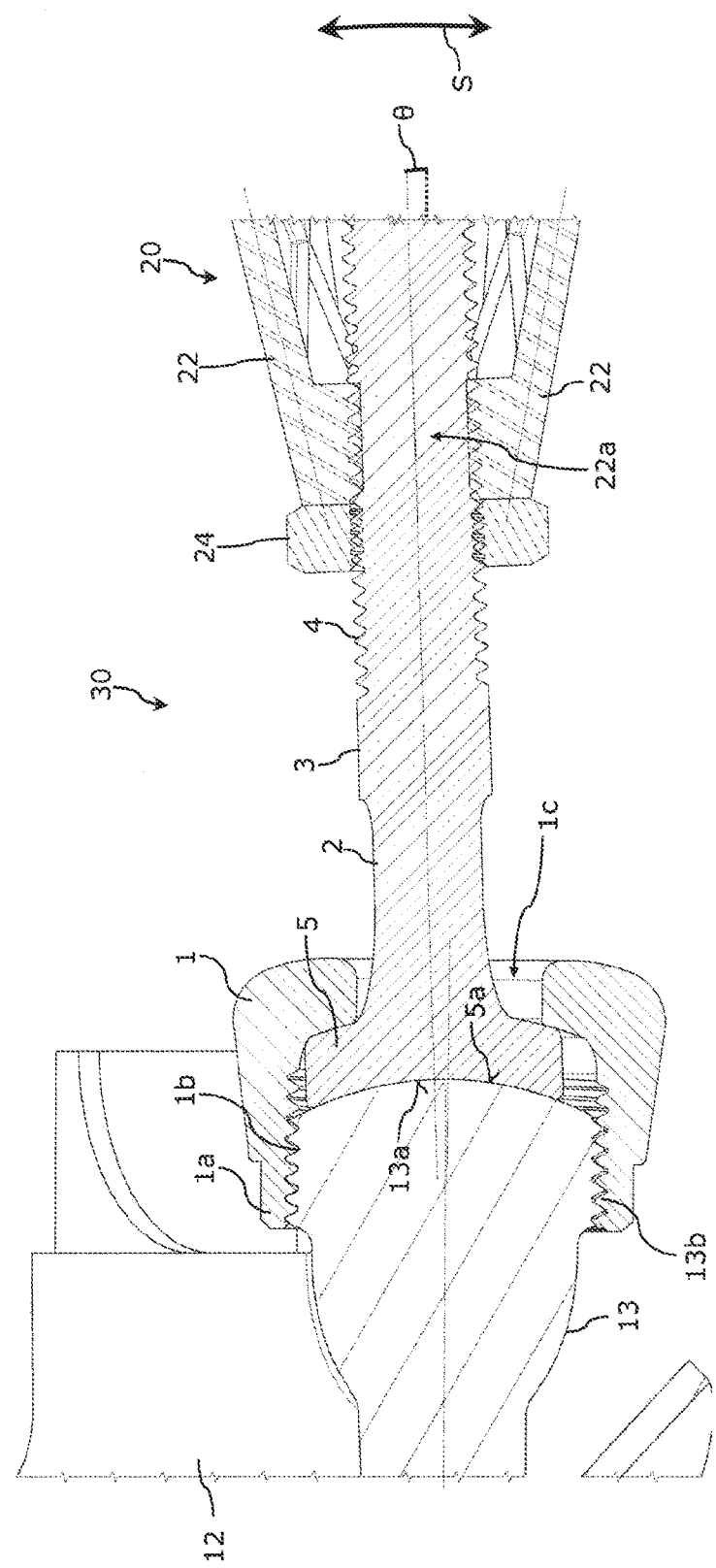
FIG. 4 schematically illustrates a cross-sectional view along the line B-B of FIG. 2 with the strut swivelled out of its baseline position.

FIG. 2 shows a front view of a connection strut 20 with rotary joint regions 30 at both strut ends. FIG. 3 schematically illustrates a cross-sectional view along the line B-B of FIG. 2 in a baseline position, whereas FIG. 4 schematically illustrates the cross-sectional view along the line B-B of FIG. 2 with the strut 20 swivelled out of its baseline position. In conjunction with FIGS. 2, 3 and 4, the left hand side rotary joint region 30 of a strut 20 is explained and shown in more detail.

FIG. 5 schematically illustrates a front view of a connection strut 20 with a connection part of a rotary joint 10 at its right hand side rotary joint region 30. Corresponding thereto, FIG. 6 schematically illustrates a cross-sectional view along the line A-A of FIG. 5. In conjunction with FIGS. 5 and 6, the right hand side rotary joint region 30 of a strut 20 is explained and shown in more detail.

The left hand side rotary joint region 30 of the strut 20 includes a socket rod with a threaded adjustment stem that may be threadingly engaged with a correspondingly threaded mounting shank of the strut main body. On the contrary, the right hand side rotary joint region 30 of the strut 20 includes a socket rod with a locking stem that may be introduced in a force-fit or form-fit engagement with the strut main body. It should, however, be understood that the strut 20 as exemplarily shown in the drawings does not need to have different types of engagement mechanisms on both ends. It may equally be possible to provide for a strut having threadingly engaged adjustment stems at both ends of the strut main body or, alternatively, a strut having locking stems in a force-fit or form-fit engagement at both ends of the strut main body.

The rotary joint 10 comprises a socket rod 2, for example a generally cylindrical socket rod with a tapered middle portion. At a first end of the socket rod 2—the left hand side in the FIGS. 3 and 4—the socket rod 2 has a socket rod flange 5 attached thereto. The socket rod flange 5 may be integrally fabricated with the middle portion of the socket rod 2. The socket rod flange 5 has an at least partly spheroid concave bearing surface 5a at a first end, i.e. the bearing surface 5a has a curvature where the radius of the curvature lies outside the socket rod 2.

A generally cylindrical housing nut 1 encircles the socket rod 2 and has a threaded wrenching head 1a. The threaded wrenching head 1a may have an angular contour, for example a hex contour for a wrenching tool to grip thereon and exert a torque onto the housing nut 1. The housing nut 1 has an opening on the flange side of the socket rod 2 the diameter of which exceeds the diameter of the opening on the opposite side of the housing nut 1. In other words, the housing nut 1 has a nut hole 1c on the opposite side of the threaded wrenching head 1a, the diameter D of which is smaller than the diameter of the opening of the threaded wrenching head 1a. The threaded wrenching head 1a has a female-thread inner thread 1b formed on its inner walls.

The nut hole 1c is larger in diameter than the diameter of the socket rod 2 so that the housing nut 1 is able to be moved along a slip path L along the axis of extension of the socket rod 2. The socket rod flange 5, however, is formed with a larger diameter than the diameter D of the nut hole 1c so that the housing nut 1 may not slip off the socket rod 2 over the socket rod flange 5.

The rotary joint 10 further comprises a ball rod 13 that has a ball rod head with threaded side walls 13b and an at least partly spheroid convex bearing surface 13a, i.e. the bearing surface 13a has a curvature where the radius of the curvature lies inside the ball rod 13. The diameter of the threaded side walls 13b of the ball rod 13 corresponds to a diameter of the threaded wrenching head 1a of the housing nut 1. The curvature of the concave bearing surface 5a of the socket rod flange 5 particularly corresponds to the curvature of the convex bearing surface 13a of the ball rod 13, so that a smooth contacting area between the socket rod 2 and the ball rod 13 is guaranteed. For assembly of the rotary joint 10, the bearing surfaces 5a and 13a of the socket rod 2 and ball rod 13, respectively are brought into contact. Then, the housing nut 1 is guided over the socket rod flange 5 and threadingly engaged with the threaded side walls 13b of the ball rod 13. This provides a housing of the socket rod flange 5 between the inner hollow of the housing nut 1 and the ball rod 13.

The housing nut 1 is then tightened up to a point where the socket rod flange 5 is securely held in contact with the ball rod 13 at the respective contacting surfaces 5a and 13a. However, the tightening of the housing nut 1 is chosen in such a way that the socket rod flange 5 and the ball rod head are still able to move in sliding or swivelling motion S with respect to each other, as shown in FIG. 4. The swivelling motion S will displace the socket rod 5 out of axis of the ball rod 13 by a swivelling angle θ. The maximum possible swivelling angle θ will be determined by the ratio between the nut hole diameter D and the height H of the housing nut 1.

The ball rod 13 may generally be attached to any bearing structure 11, such as a bracket 12, a holder, a support beam or any other suitable means. It may also be possible to provide more than one ball rod 13 with different directions of extension to the same bearing structure 11 in order to provide for an interconnection node for multiple struts 20.

The socket rod 2 of FIGS. 3 and 4—and as disclosed on the left hand side of FIG. 2—may have a threaded shank with a socket rod thread 4. The threaded shank may be located on an end portion opposite to the end portion having the socket rod flange 5. In the middle portion of the socket rod 5, a wrenching contour 3 may be arranged on the circumference of the socket rod 2. The wrenching contour 3 may for example be a series of angled surfaces, such as a hex, for wrenching tools to grip on the socket rod 2 and exert a torque on the socket rod 2 around its main axis of extension.

The threaded shank may be used for connecting the socket rod 2 to an interconnection strut 20, such as for example a Samer rod. The strut 20 may for this purpose have a corresponding female-threaded socket rod duct 22a located at a first strut end portion. The female-threaded socket rod duct 22a may be threadingly engaged with the threaded shank of the socket rod 2. Additionally, a strut wrenching head 24 may be provided on the end portion of the strut 20 in order to have a way or means for exerting a countering force to the torque exerted on the socket rod wrenching contour 3 when engaging the socket rod 2 with the strut 20.

The threaded shank of the socket rod 20 advantageously allows for adjusting the distance by which the socket rod 2 protrudes from the strut 20, thereby enabling a framework constructed with rotary joints 10 and interconnection struts, such as a framework 100 of FIG. 1, to be flexibly designed with regard to strut lengths between different interconnecting nodes.

The interconnection struts 20 themselves may comprise a trussed beam, for example built up with an isometric framework. Those trussed beams may for example include a plurality of substantially longitudinally running chord members 21 distributed around a central axis. A plurality of web members 23 may be provided, spanning between the chord members 21 in zig-zag, diagonal or otherwise grid-like manner. The central diameter of the trussed beams may in particular be larger than the diameter of the socket rods 2. Thus, it may be possible to provide the end portions of the struts 20 as tapered regions with chord members 22 tapering from the central portion towards the ends of the strut 20.

As shown in conjunction with FIGS. 5 and 6, the interconnection struts 20 may also comprise a different mechanism for connecting with the socket rods 2. For example, at a second strut end portion, i.e. on the right hand side of FIGS. 5 and 6, the struts 20 may have a receptacle, for example located within the chord members 22. The socket rod 2 may in this case have snap-fit end portion 6, such as a slightly forked and resilient engagement member, that may be engaged in a snap-fit engagement with the strut 20.

FIG. 7 schematically illustrates a front view of a connection strut 20 with a connection part of a rotary joint 10 at its left and right hand side rotary joint region 30. Corresponding thereto, FIG. 8 schematically illustrates a cross-sectional view along the line B-B of FIG. 7. In conjunction with FIGS. 7 and 8, the left hand side rotary joint region 30 of a strut 20 is explained and shown in more detail.

Similar to the rotary joints 10 of FIGS. 3 and 4, the rotary joint 10 of FIG. 8 comprises a socket rod 2, for example a generally cylindrical socket rod with a tapered middle portion. At a first end of the socket rod 2—the right hand side in the FIG. 8—the socket rod 2 has a socket rod flange 5 attached thereto. The socket rod flange 5 may be integrally fabricated with the middle portion of the socket rod 2. The socket rod flange 5 has an at least partly spheroid concave bearing surface 5a at a first end, i.e. the bearing surface 5a has a curvature where the radius of the curvature lies outside the socket rod 2.

The rotary joint 10 of FIG. 8 further comprises a ball rod 13 that has a ball rod head with threaded side walls 13b and an at least partly spheroid convex bearing surface 13a, i.e. the bearing surface 13a has a curvature where the radius of the curvature lies inside the ball rod 13. The diameter of the threaded side walls 13b of the ball rod 13 corresponds to a diameter of the threaded wrenching head 1a of the housing nut 1. The curvature of the concave bearing surface 5a of the socket rod flange 5 particularly corresponds to the curvature of the convex bearing surface 13a of the ball rod 13, so that a smooth contacting area between the socket rod 2 and the ball rod 13 is guaranteed. For assembly of the rotary joint 10 in FIG. 8, the bearing surfaces 5a and 13a of the socket rod 2 and ball rod 13, respectively are brought into contact. Then, the housing nut 1 is guided over the socket rod flange 5 and threadingly engaged with the threaded side walls 13b of the ball rod 13. This provides a housing of the socket rod flange 5 between the inner hollow of the housing nut 1 and the ball rod 13.

In contrast to the rotary joints 10 of FIGS. 3 and 4, however, the rotary joint 10 of FIG. 8 has its ball rod 13 connected to an interconnection strut 20. For example, the ball rod 13 may be formed integrally at an end portion of the strut 20. When the housing nut 1 is threadingly engaged with the threaded side walls 13b of the ball rod 13, a clamping bracket 8, for example an annular clamping bracket sleeving the ball rod 13 and the end portion of the strut 20 at least partially, may be affixed to the rotary joint 10. This further secures the positioning of the housing nut 1 with respect to the strut 20 and prevents the housing nut 10 from accidentally coming loose due to vibrations or other mechanical strain.

FIG. 9 shows a rotary joint 10 similar to the rotary joint 10 of FIG. 8 where an additional sliding washer 7, such as an annular disk with a spheroid curvature matching the curvature of the socket rod flange 5 is introduced in the space between the socket rod flange 5 and the inner walls of the threaded side walls 13b of the ball rod 13. The sliding washer 7 may have a smaller diameter than the socket rod flange 5, but a larger diameter than the socket rod side of the housing nut 1. That way, the sliding washer 7 will allow for more leeway for the socket rod flange 5 to move along the ball rod surface 13a, but will prevent the socket rod flange 5 from slipping out of the housing nut 1. Such a sliding washer 7 may increase the maximum swivelling angle $\theta$ of the swivelling cone between the socket rod 2 and the ball rod 13.

The function of the rotary joints 10 as shown and explained in conjunction with FIGS. 2 to 9 is to divert torsional moments acting on the struts 20 lateral to their main axis. Since the struts are able to swerve or give way along the contacting surfaces 5a and 13a of the ball-and-socket bearing, this swivelling motion of the struts 20 will always be able to compensate for any lateral moments acting on the struts 20. Thus, the force lines running along the main axis of the struts 20 will always intersect at the same force line intersection point in the center of the rotary joint 10, thereby not creating any net moment on the rotary joint 10 as a whole. As a consequence, the rotary joint 10 is free from torsional stress, leading to greater mechanical stability.

The framework construction kit as described as explained above is a cheap, extremely light and flexible system that allows for rapid construction and deconstruction of multiple structures of varying outer profile. The framework construction kit may for example be used to build bending beams that are essentially free from torsional moments in the interconnection joints. It allows for tolerance compensation and adjustment to flexible surfaces such as aircraft flaps or wings.

A particular advantage of the framework construction kit as disclosed, and in particular of the rotary joint 10 is the possibility to manufacture all parts using a 3D printing or an Additive Manufacturing (AM) technique. Particularly the joints 10 may be 3D printed with the housing nut 1 already manufactured seamlessly around the socket stem 2. This leads to an advantageous mechanical stability of the rotary joint 10.

A method for manufacturing a rotary joint, such as a rotary joint 10 as described in conjunction with FIGS. 2 to 9, comprises in a first step integrally forming a socket rod 2 having a socket rod flange 5 with an at least partly spheroid concave bearing surface 5a at a first end together with a housing nut 1, the housing nut 1 encircling the socket rod 2 and having a threaded wrenching head 1a. This first step is in particular done using a 3D printing or additive manufacturing, AM, technique. Then, in a second step, a ball rod 13 having an at least partly spheroid convex bearing surface 13a and threaded side walls around the bearing surface 13a is formed, using a 3D printing or additive manufacturing, AM, technique as well.

Finally, the threaded wrenching head 1a of the housing nut 1 is threadingly engaged with the threaded side walls of the ball rod 13 in a third step. In this manner, the socket rod flange 5 is housed between the housing nut 1 and the ball rod 13 and restrained from any other motion than a swivelling motion in a swivelling cone with respect to the contacting surfaces 5a and 13a. Optionally, a sliding washer 7 may be introduced between the socket rod flange 5 and the inner walls of the threaded wrenching head 1a before threadingly engaging the threaded wrenching head 1a of the housing nut 1 with the threaded side walls of the ball rod 13. The sliding washer 7 may have a smaller diameter than the socket rod flange 5, but a larger diameter than the socket rod side of the housing nut 1. That way, the sliding washer 7 will allow for more leeway for the socket rod flange 5 to move along the ball rod surface 13a, but will prevent the socket rod flange 5 from slipping out of the housing nut 1. Such a sliding washer 7 may increase the maximum swivelling angle of the swivelling cone between the socket rod 2 and the ball rod 13.

The rotary joint 10, the frameworks 100 making use of such rotary joints 10 and the methods for manufacturing those rotary joints 10 reduce the number of individual parts necessary for the formation and functionality of the rotary joints 10 to a minimum. On one hand, the installation effort for such joints is minimized—on the other hand, the design precision in alignment of the individual parts advantageously decrease with the reduction in part count.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case. While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A rotary joint comprising:
    a socket rod having a socket rod flange with an at least partly spheroid concave bearing surface at a first end;
    a housing nut encircling the socket rod and having a threaded wrenching head; and
    a ball rod integrally formed to have an at least partly spheroid convex bearing surface with threaded side walls formed around the convex bearing surface,
    wherein a diameter of the threaded side walls of the ball rod corresponds to a diameter of the threaded wrenching head of the housing nut.

2. The rotary joint of claim 1, wherein the housing nut has a nut hole on an opposite side thereof from the threaded wrenching head, a diameter of the nut hole being larger than a diameter of the socket rod, but smaller than a diameter of the socket rod flange.

3. The rotary joint of claim 1, wherein a curvature of the concave bearing surface of the socket rod flange corresponds to a curvature of the convex bearing surface of the ball rod.

4. The rotary joint of claim 1, wherein the socket rod comprises a threaded shank at a second end that is opposite to the first end, which is not threaded.

5. The rotary joint of claim 4, wherein the socket rod comprises a wrenching contour arranged on a circumference of the socket rod between the socket rod flange and the threaded shank.

6. The rotary joint of claim 1, comprising a sliding washer arranged between the socket rod flange and inner walls of the threaded wrenching head.

7. The rotary joint of claim 1, wherein the convex bearing surface has a same diameter as the diameter of the threaded side walls, such that the convex bearing surface extends entirely between diametrically opposite sides of the ball rod.

8. A framework construction kit comprising:
    at least one rotary joint comprising:
    a socket rod having a socket rod flange with an at least partly spheroid concave bearing surface at a first end;
    a housing nut encircling the socket rod and having a threaded wrenching head; and
    a ball rod integrally formed to have an at least partly spheroid convex bearing surface with threaded side walls formed around the convex bearing surface,
    wherein a diameter of the threaded side walls of the ball rod corresponds to a diameter of the threaded wrenching head of the housing nut; and
    at least one interconnection strut connected to a second end of the socket rod of the at least one rotary joint or connected to the ball rod.

9. The framework construction kit of claim 8, wherein the at least one interconnection strut comprises a trussed beam having a plurality of substantially longitudinally running chord members and a plurality of web members spanning between the chord members.

10. The framework construction kit of claim 8, wherein the socket rod of the at least one rotary joint comprises a threaded shank at a second end that is opposite to the first end, which is not threaded, and wherein the at least one interconnection strut comprises, at a first strut end portion, a female-threaded socket rod duct engaged with the threaded shank of the socket rod.

11. The framework construction kit of claim 8, wherein the at least one interconnection strut comprises, at a second strut end portion, a receptacle engaged in a snap-fit engagement with an end portion of the socket rod of the rotary joint.

12. The framework construction kit of claim 8, wherein the at least one interconnection strut is interlocked at a second strut end portion with the ball rod by an annular clamping bracket sleeved at least partly over the second strut end portion and the ball rod.

13. The framework construction kit of claim 8, wherein the convex bearing surface has a same diameter as the diameter of the threaded side walls, such that the convex bearing surface extends entirely between diametrically opposite sides of the ball rod.

14. A framework, comprising:
   a plurality of rotary joints attached to a plurality of bearing structures, each of the plurality of rotary joints comprising:
   a socket rod having a socket rod flange with an at least partly spheroid concave bearing surface at a first end;
   a housing nut encircling the socket rod and having a threaded wrenching head; and
   a ball rod integrally formed to have an at least partly spheroid convex bearing surface with threaded side walls formed around the convex bearing surface,
   wherein a diameter of the threaded side walls of the ball rod corresponds to a diameter of the threaded wrenching head of the housing nut; and
   a plurality of interconnection struts, each connected to the socket rods or the ball rods of the plurality of rotary joints.

15. The framework of claim 14, wherein the convex bearing surface has a same diameter as the diameter of the threaded side walls, such that the convex bearing surface extends entirely between diametrically opposite sides of the ball rod.

16. A method for manufacturing a rotary joint, the method comprising:
   integrally forming a socket rod having a socket rod flange with an at least partly spheroid concave bearing surface at a first end simultaneously with a housing nut, such that the housing nut encircles the socket rod and has a threaded wrenching head, using a 3D printing or additive manufacturing (AM) technique;
   forming a ball rod having an at least partly spheroid convex bearing surface that is integrally formed with threaded side walls around the convex bearing surface using a 3D printing or AM technique; and
   threadingly engaging the threaded wrenching head of the housing nut with the threaded side walls of the ball rod, thereby housing the socket rod flange within the housing nut and against the ball rod.

17. The method of claim 16, comprising, before threadingly engaging the threaded wrenching head of the housing nut with the threaded side walls of the ball rod, arranging a sliding washer between the socket rod flange and inner walls of the threaded wrenching head.

18. The method of claim 16, wherein the convex bearing surface has a same diameter as a diameter of the threaded side walls, such that the convex bearing surface extends entirely between diametrically opposite sides of the ball rod.

* * * * *